United States Patent Office 3,346,494
Patented Oct. 10, 1967

3,346,494
MICROEMULSIONS IN LIQUID HYDROCARBONS
Max L. Robbins, South Orange, N.J., and Jack H. Schulman, New York, N.Y., assignors, by direct and mesne assignments, to Esso Research and Engineering Company, Elizabeth, N.J., a corporation of Delaware
No Drawing. Filed Apr. 29, 1964, Ser. No. 363,642
16 Claims. (Cl. 252—33.2)

The present invention relates to new compositions and to processes for making and using said compositions. In general, it relates to stable microemulsions prepared by the use of a select combination of microemulsifiers. In particular, it concerns the preparation and uses of microemulsions in a liquid hydrocarbon medium.

A microemulsion, as herein defined, is a clear or very slightly hazy emulsion having a droplet size of the dispersed phase of less than 400 A. and preferably less than 100 A.

The microemulsions of the present invention employ a liquid hydrocarbon as the continuous phase and a hydrocarbon insoluble medium as the dispersed phase. The select combination of microemulsifiers employed in order to obtain the desired droplet size of the dispersed phase is fully described in the following disclosure.

By the use of this select combination of microemulsifiers it has been found possible to produce clear, completely stable (having a bench life of years) microemulsions. In addition, this combination of microemulsifiers is readily and economically available. Other advantages will be apparent in the discussion that follows.

The microemulsions of the present invention have been found to have several important and distinct uses which will be described in detail. However, these uses are not to be considered as limiting the invention in any respect.

The microemulsions of the present invention are formed spontaneously upon the addition of the dispersable phase to the continuous phase, to which has been added the select combination of microemulsifiers. Thus, the microemulsions can be prepared at ambient temperature, without using heat. The only mechanical energy which is necessary is that which effects simple mixing of the phases.

The continuous phase is a liquid hydrocarbon. Any liquid hydrocarbon sufficiently mobile to permit mixing is suitable, regardless of viscosity. For example, media such as lubricating oils, solvents such as benzene and toluene, mixtures of any of the above, etc. are suitable for use as the continuous phase. A preferred medium is a mineral lubricating oil. Illustrative of the wide variety of liquid hydrocarbons which may be used are the specific examples which follow.

The dispersable phase is hydrocarbon insoluble and is determined by the particular application in which the microemulsion is employed. Usually, however, it consists of a volatile medium such as water, methanol, or aqueous or methanolic solutions of inorganic salts and bases (oxides and hydroxides). Water is particularly preferred in many applications. Suitable non-volatile media include, for example, ethylene glycol, glycerol, etc.

The select combination of microemulsifiers used in the present invention consists of three ingredients. These three ingredients and the relative proportions in which they are used are:

| | Parts by weight |
|---|---|
| (1) Fatty acid | 1 to 10, preferably 1 to 5 |
| (2) Amino alcolhol | 1 to 10, preferably 1 to 2 |
| (3) Alkyl phenol | 1 to 10, preferably 1 to 5 |

The weight percent of the above three ingredients which is used will depend upon the particular application. In general however, this combination of ingredients will comprise about 1 to 50 wt. percent, preferably 10 to 35 wt. percent, of the hydrocarbon system (i.e. continuous phase and select combination of microemulsifiers).

The weight percent of the dispersable phase which is used will also depend upon the particular application. In some applications one part by weight of the combination of ingredients (i.e. microemulsifiers) will not microemulsify more than about 3 parts of the dispersable phase while in other applications one part may microemulsify as much as about 10 parts. Economically, excess amounts of microemulsifying agents are not used. Usually, about equal parts of microemulsifier and dispersable phase are used.

The fatty acids suitable for this invention include those having from 12 to 20 carbon atoms. The acid may be saturated, for example, palmitic or stearic acid or it may be unsaturated. The preferred acids are those which contain 1 (e.g. oleic), 2 (e.g. linoleic), or 3 (e.g. linolenic) double bonds. Other suitable acids include lauric, myristic, palmitoleic, elaidic, eleostearic, licanic, ricinoleic, vaccenic, and punicic. These acids may be substituted or unsubstituted; however, it is preferred that they be unsubstituted. Economically, an especially preferred acid is the mixture of tall oil fatty acids obtained under the trade name Acintol FA1.

Suitable amino alcohols include primary, secondary and tertiary alkyl amino alcohols containing from 2 to 5 carbon atoms per alkyl group. Suitable amino alcohols include for example, ethanolamine diethanol amine, 2-amino-2-methyl propanol-1, 2-amino-2-methanol butanol-1, etc. The preferred amino alcohols are the primary, secondary and tertiary isopropanol amines, to wit, mono-isopropanol amine, diisopropanol amine, and triisopropanol amine. Economically, mixtures of isopropanol amines, for example, "Mixed Isopropanolamine" sold by Dow Chemical Company are preferred.

The alkyl phenols suitable for this invention include the mono- and polyhydroxy compounds having an alkyl group containing from 8 to 12 carbon atoms. The alkyl group, saturated or unsaturated, can be branched or straight chained. The group may be substituted with halogen groups or the like but is preferably unsubstituted. Likewise, the aryl group(s), phenyl or naphthyl, may be substituted with a halogen or the like, but it is preferably unsubstituted. The presence of one to two other alkyl groups containing from about 1 to 12 carbon atoms per group on the aryl group will not hinder the performance of a phenol so long as the phenol has at least one alkyl group containing from 8 through 12 carbon atoms. Thus, it is seen that the cresols, that is, the methyl phenols, may be used to synthesize the alkyl phenols of this invention. Examples of suitable alkyl phenols include octyl, phenol, nonyl cresol 1-propyl-3-dodecyl phenol, 1,3-dimethyl-5-decyl phenol, etc. Economically, a mixture prepared by alkylation of phenol with tripropylene and comprising about 60–70% mononyl phenol and about 30–40% dinonyl phenol is preferred.

Example I illustrates the preparation of a microemulsion of the present invention.

*Example 1*

To a mixture of 550 grams of a mineral lubricating oil (150 SSU at 100° F.) 71 grams of oleic acid, 22 grams of 2-amino-2-methyl propanol-1, and 20 grams of mixed mono- and dinonyl phenol, 60 cc. of water were added, at ambient temperature and with simple agitation (to effect mixing of the phase), to form a hazy microemulsion. The mixed mono- and dinonyl phenol was prepared by alkylation of phenol with tripropylene and comprised about 65 to 70 weight percent mononyl phenol and about 30–35 weight percent of dinonyl phenol.

In one aspect of the present invention the microemulsions may be used to prepare high concentrations (e.g. up to about 25 weight percent) of inorganic materials in hydrocarbon oils. In such an application the select group of microemulsifiers is added to the continuous phase and a microemulsion is formed by adding a volatile medium containing the inorganic material as the dispersable phase. The inorganic material, which may comprise an inorganic salt, oxide or hydroxide that is soluble or only slightly soluble in the volatile medium is usually added to the volatile medium (dispersed phase of the microemulsion) prior to microemulsifying the volatile medium in the hydrocarbon but may in some instance be added to the already formed microemulsion. The inorganic material dissolved in the volatile dispersed phase may or may not be reacted further to form a material insoluble in the volatile phase. The volatile medium is thereafter removed from the system by heating, preferably flash drying, with or without reduced pressure, leaving a clear stable dispersion of a high concentration of inorganic material in liquid hydrocarbon.

*Example 2*

A hazy microemulsion was prepared by adding, at ambient temperature and with simple agitation, 50 cc. of water to a mixture of 75 grams of oleic acid, 20 grams of mixed mono-, di- and triisopropanol amines (commercial product of Dow Chemical Company comprising mixed isopropanol amines having an apparent equivalent weight of about 140; hereafter referred to as "Dow" mixed isopropanol amine), 20 grams of mixed mono- and dinonyl phenol (as in Example 1) and 350 grams of a mineral lubricating oil (150 SUS at 100° F.). The microemulsion was heated to 75° C. and 150 grams of calcium hydroxide were added. The mixture was then treated with 2 mols of carbon dioxide passed in over a period of 1 hour at a temperature of about 85 to 87° C. After the treatment with $CO_2$ was completed the temperature was slowly raised to about 150° C. and the mixture was then filtered through a filter aid to give a clear amber colored liquid consisting of a colloidal dispersion containing 20.6 weight percent of calcium carbonate.

*Example 3*

A mixture was prepared consisting of 300 grams of mineral lubricating oil (150 SUS at 100° F.), 90 grams of tall oil fatty acid obtained under the trade name Acintol FA1, 12 grams of "Dow" mixed isopropanolamine and 24 grams of mixed mono- and dinonyl phenol (as in Example 1). To this were added, at ambient temperature and with simple agitation, 30 grams of water, forming an almost opaque emulsion which became more translucent on heating to 50° C. Then 150 grams of calcium hydroxide were added at 50° C. and the system was heated to 85° C., following which 3 moles of $CO_2$ were added at a temperature of 85 to 90° C. over a period of about 1 hour. The system was then heated to 150° C. and filtered. The straw-colored filtrate was a colloidal dispersion containing 21.5% calcium carbonate.

*Example 4*

A mixture was prepared consisting of 200 grams of mineral lubricating oil (150 SUS at 100° F.), 50 grams of tall oil fatty acids (Acintol FA1), 50 grams of mixed mono- and dinonyl phenol (as in Example 1) and 15 grams of "Dow" mixed isopropanolamine. To this was added, at ambient temperature and with simple agitation, a clear solution of 100 grams of $PbAc_2 \cdot 3H_2O$ in 15 grams of methanol to form a hazy microemulsion. 30 grams of 2-butoxy ethanol were added, yielding a clear microemulsion containing 21.8% $Pb \cdot Ac_2 3H_2O$.

In another aspect of the present invention the microemulsions are employed to prepare high concentrations of inorganic materials in hydrocarbon oils which contain an oil-soluble surface active agent. The preparation is the same as the preparation described above (i.e. without the use of a surface active agent) with the exception that about 10 to 50 wt. percent preferably 15 to 30 wt. percent of an oil-soluble surface active agent is added to the microemulsion. This aspect of the invention provides, for example, a process for increasing the basicity of surface active agents such as 900 M.W. calcium sulfonate, etc. The agents include, but are not limited to, phosphosulfurized olefins and alcohols, long chain organic phosphates and sulfonates. While the preparations of these agents are well known in the art a brief description of their preparation follows.

The phosphosulfurized olefins and alcohols mentioned above are readily prepared by reaction of a suitable polyolefin or alcohol with $P_2S_5$. In the case of a polyolefin, as for example a polybutene of about 1000 molecular weight, the hydrocarbon polymer is reacted with about 5 to 30 wt. percent of a phosphorus sulfide, preferably with about 10 to 20 wt. percent of phosphorus pentasulfide, under anhydrous conditions at temperatures of about 65 to 320° C. for a period of from about ½ to 15 hours.

The long chain organic phosphates can be prepared by reacting 1 mol of $P_2O_5$ with from 2 to 6 mols, preferably 2 to 4 mols, of a suitable alcohol of from 6 to 16 carbon atoms per molecule at temperatures of from about 10 to about 100° C. for from ¼ to 4 hours. Depending upon the reaction conditions and the particular alcohols used, the reaction products will vary in composition but will usually comprise chiefly a mixture of the orthophosphoric acid mono- and diesters of the alcohols along with minor amounts of unreacted alcohols, orthophosphoric acid and condensed polyphosphates. Particularly preferred are reaction products of $P_2O_5$ with oxo alcohols. Oxo alcohols are well known to the art, being prepared by reaction of olefins with carbon monoxide and hydrogen in the presence of a cobalt catalyst or similar catalyst to form aldehydes of one more carbon atom than the starting olefins followed by catalytic hydrogenation to the corresponding alcohols.

The sulfonates that may be used are well known in the art and can be obtained by forming the salts of high molecular weight sulfonic acids prepared by treatment of petroleum oils of the lubricating oil range with highly concentrated or fuming sulfuric acid. Suitable sulfonic acids can also be produced by sulfonating alkylated aromatic hydrocarbons such as tetraisobutyl benzene.

The following examples serve to illustrate this particular aspect of the present invention.

*Example 5*

A hazy water-in-oil microemulsion was prepared by adding, at ambient temperature and with simple agitation, 15 grams of water to a mixture consisting of 150 grams of mineral lubricating oil (150 SUS at 100° F.), 15 grams of tall oil fatty acids (Acintol FA1), 6 grams of "Dow" mixed isopropanolamine, 9 grams of mixed mono- and dinonyl phenol (as in Example 1), and 30 grams of a surface active agent comprised of polyisobutenyl succinic anhydride (prepared from 780 molecular weight polyisobutylene and maleic anhydride). The microemulsion was heated to about 50° C. and 55.5 grams of $Ca(OH)_2$ were added. The mixture was then treated with 0.75 mol of $CO_2$ passed in over a period of about 30 minutes at a temperature of about 85 to 90° C. The temperature was then slowly raised to 150° C. and the mixture was then filtered through a filter aid to give a faintly hazy straw colored liquid comprising colloidally dispersed calcium carbonate and containing 8.0% Ca.

*Example 6*

A clear microemulsion is prepared by adding together 300 grams of a 900 molecular weight calcium petroleum sulfonate concentrate (50% active material in mineral lubricating oil), 5 grams of tall oil fatty acids (Acintol FA1), 5 grams of "Dow" mixed isopropanolamine, 5 grams of mixed mono- and dinonyl phenol (as in Example 1), 12 grams of sodium xylene sulfonate (42% aqueous solution) and 5 grams of ethylene diamine. The microemulsion is heated to about 80° C. and 100 grams of Ca(OH)₁ are added. The mixture is treated with $CO_2$ for 1 hour at a rate of 1 mole/hour. Filtration yields a bright product comprising colloidally dispersed calcium carbonate and containing 11.8% Ca.

*Example 7*

A clear microemulsion is prepared by adding together 5000 grams of a 900 molecular weight calcium petroleum sulfonate concentrate (45% active ingredient in mineral lubricating oil), 1000 grams of mineral lubricating oil (150 SUS at 100° F.), 112.5 grams of tall oil fatty acids (Acintol FA1), 112.5 grams of "Dow" mixed isopropanolamine, 75 grams of mixed mono- and dinonyl phenol (as in Example 1), 106 grams of ethylene diamine and 19 grams of water. The microemulsion is heated to about 80° C. and 1625 grams of $Ca(OH)_2$ are added. The mixture is treated with $CO_2$ for 6 hours at a rate of 365 moles/hour at a temperature of 126 to 131° C. The mixture is heated to 150° C. to drive off water. Filtration yields a bright product comprising colloidally dispersed calcium carbonate and containing 11.0 to 11.5% Ca.

The microemulsions of the present invention may be employed directly as superior lubricants for diesel and gasoline engine service. In such applications the lubricant is characterized by a long useful life. The long life is obtained because water, sludge, varnish precursors and other impurities formed during engine operation become suspended in the microemulsion and the deleterious effects of these impurities are thereby minimized. In a similar application the select microemulsifier system may be used to remove water haze from petroleum products such as jet fuel oils, etc.

Macroemulsions can be destroyed and converted to microemulsions by the use of the select group of emulsifying agents. For instance, macroemulsions containing water and sludge formed in fuel oil tanks and leading to poor burner performance and in some cases to burner failure, can be destroyed. The occurrence of such macroemulsions often requires that a portion of the fuel be reprocessed in order to reduce the impurities (i.e. water and sludge) to an acceptable level of about 30 p.p.m. at 30° F. By using a mixture of tall oil fatty acids, mixed isopropanolamines and alkyl phenols in relative proportions of about 5:2:2 the macroemulsion can be converted to a microemulsion, obviating the need for reprocessing the fuel oil. The select mixture of microemulsifiers should be used in weight ratio to water present within the range of about 1:10 to 2:1, for example 1:1.

Closely related to the above-mentioned applications of the microemulsions of the present invention are the use of said microemulsions as antirusting agents for hydrocarbon oils and their use as agents for decreasing filter plugging in systems employing filters which become plugged with macroemulsions.

It has been found that the microemulsions of the present invention may be extremely useful in applying trace elements to mineral-deficient crops. For example, at the present time iron-deficient plants are treated with a water solution of an iron chelate complex e.g. sodium ferric diethylene triamine pentacetate. This complex is inherently expensive. By the use of a microemulsion of the present invention trace elements may be applied to crops in the form of a microemulsion of water soluble salts of elements, e.g. $FeCl_3$ in a spray oil. The oil medium of the microemulsion holds the element in contact with the leaves of the plant until the element can be absorbed. The use of $FeCl_3$ eliminates the use of the expensive iron chelate complex. As an example of this aspect of the invention, a solution consisting of water and about 25 wt. percent $FeCl_3$ is prepared. This solution comprises the dispersable phase of the microemulsion. The solution is added to a spray oil containing about 50 wt. percent of the select combination of microemulsifiers (e.g. lauric acid, diethanol amine, and octyl phenol in relative proportions of about 5:2:2), to yield a microemulsion consisting of about equal parts of continuous phase, dispersable phase and microemulsifiers. The resulting microemulsion is then applied (e.g. sprayed) to the crops.

Several uses for the microemulsions of the present invention have been disclosed above. It is not intended that this disclosure limit the scope of the invention in any respect.

What is claimed is:

1. A liquid hydrocarbon system capable of forming a clear stable microemulsion upon the addition of a hydrocarbon insoluble dispersable phase which comprises a major proportion of a hydrocarbon lubricating oil and a minor proportion, sufficient to form a droplet size of the dispersed phase of less than 400 A., of a combination of microemulsifiers consisting essentially of
   (a) from about 1 to 10 parts by weight of a fatty acid having from 12 to 20 carbon atoms,
   (b) from about 1 to 10 parts by weight of an alkyl amino alcohol containing from 2 to 5 carbon atoms per alkyl group, and
   (c) from about 1 to 10 parts by weight of an alkylated phenol having at least one alkyl group containing 8 to 12 carbon atoms.

2. A liquid hydrocarbon system as defined by claim 1 wherein said minor proportion is about 10 to 35 wt. percent, the relative proportions of (a), (b) and (c) are in the range of about 1 to 5 parts by weight (a), 1 to 2 parts by weight (b) and 1 to 5 parts by weight (c).

3. A liquid hydrocarbon system as defined in claim 1 wherein (a) is oleic acid, (b) is a mixture of mono-, di-, and triisopropanol amines and (c) is nonyl phenol.

4. A liquid hydrocarbon system as defined in claim 1 wherein (a) is a mixture of tall oil fatty acids.

5. A process for preparing high concentrations of an inorganic material in a liquid hydrocarbon which comprises adding to said liquid hydrocarbon (1) a volatile dispersible medium insoluble in said liquid hydrocarbon and containing an inorganic material and (2) a sufficient minor proportion of a combination of microemulsifiers consisting essentially of
   (a) from about 1 to 10 parts by weight of a fatty acid having from 12 to 20 carbon atoms,
   (b) from about 1 to 10 parts by weight of an alkyl amino alcohol containing from 2 to 5 carbon atoms per alkyl group and
   (c) from about 1 to 10 parts by weight of an alkylated phenol having at least 1 alkyl group containing 8 to 12 carbon atoms;

thereby forming a clear stable microemulsion and thereafter removing said volatile dispersable medium.

6. A process according to claim 5 wherein said volatile dispersable medium is water.

7. A process according to claim 5 wherein said volatile dispersable medium is methanol and said inorganic material is lead acetate.

8. A process according to claim 5 wherein said minor proportion is about 10 to 35 wt. percent and wherein the relative proportions of (a), (b), and (c) are in the range of about 1 to 5 parts by weight (a), 1 to 2 parts by weight (b) and 1 to 5 parts by weight (c).

9. A process according to claim 5 wherein prior to removing said volatile dispersable medium about 10 to 50 wt. percent of an oil soluble surface active agent is added to said microemulsion and thereafter said inorganic material is reacted with a second inorganic material to form an inorganic reaction product which is insoluble in said volatile dispersable medium.

10. A process according to claim 9 wherein said oil soluble surface active agent is polyisobutenyl succinic anhydride.

11. A process according to claim 9 wherein said oil soluble surface active agent is calcium petroleum sulfonate, said inorganic material is calcium hydroxide, said second inorganic material is $CO_2$ and said inorganic reaction product is calcium carbonate.

12. A process for preparing high concentrations of an inorganic material in a liquid hydrocarbon which comprises adding to said liquid hydrocarbon (1) a volatile dispersable medium insoluble in said liquid hydrocarbon and (2) a minor proportion of a combination of microemulsifiers consisting essentially of
 (a) from about 1 to 10 parts by weight of a fatty acid having from 12 to 20 carbon atoms,
 (b) from about 1 to 10 parts by weight of an alkyl amino alcohol containing from 2 to 5 carbon atoms per alkyl group, and
 (c) from about 1 to 10 parts by weight of an alkylated phenol having at least 1 alkyl group containing 8 to 12 carbon atoms;
thereby forming a clear microemulsion; mixing said microemulsion and said inorganic material and thereafter removing said volatile dispersable medium.

13. A process according to claim 12 wherein prior to removing said volatile dispersable medium said inorganic material is reacted with a second inorganic material to form an inorganic reaction product which is insoluble in said volatile dispersable medium.

14. A process according to claim 13 wherein said inorganic material is calcium hydroxide, said second inorganic material is $CO_2$ and said inorganic reaction product is calcium carbonate.

15. A clear stable microemulsion having a droplet size of the dispersed phase of less than 400 A. and consisting essentially of a hydrocarbon lubricating oil, as the continuous phase; a hydrocarbon insoluble medium, as the dispersed phase; and a combination of microemulsifiers consisting essentially of
 (a) from about 1 to 10 parts by weight of a fatty acid having from 12 to 20 carbon atoms,
 (b) from about 1 to 10 parts by weight of an alkyl amino alcohol containing from 2 to 5 carbon atoms per alkyl group and
 (c) from about 1 to 10 parts by weight of an alkylated phenol having at least one alkyl group containing 8 to 12 carbon atoms.

16. A clear stable microemulsion having a droplet size of the dispersed phase of less than 100 A. and consisting essentially of a mineral lubricating oil as the continuous phase; water as the dispersed phase; and a combination of microemulsifiers consisting essentially of
 (a) from about 1 to 10 parts by weight of oleic acid
 (b) from about 1 to 10 parts by weight of isopropanol amine and
 (c) from about 1 to 10 parts by weight of nonyl phenol.

References Cited

UNITED STATES PATENTS

| | | | |
|---|---|---|---|
| 2,695,910 | 11/1954 | Asseff et al. | 252—33 X |
| 2,744,870 | 5/1956 | Stillebroer et al. | 252—49.5 X |
| 2,962,443 | 11/1960 | Rhodes | 252—56 |

FOREIGN PATENTS

| | | |
|---|---|---|
| 782,058 | 8/1957 | Great Britain. |

DANIEL E. WYMAN, *Primary Examiner.*

C. F. DEES, *Assistant Examiner.*